United States Patent
Dunik et al.

(10) Patent No.: US 11,378,403 B2
(45) Date of Patent: Jul. 5, 2022

(54) APPARATUS AND METHOD FOR TERRAIN AIDED NAVIGATION USING INERTIAL POSITION

(71) Applicant: Honeywell International Inc., Morris Plains, NJ (US)

(72) Inventors: Jindrich Dunik, Plzen (CZ); Milos Sotak, Slavkov u Brna (CZ); Milos Vesely, Nemcice (CZ); Wesley J. Hawkinson, Chanhassen, MN (US); Kenneth Steven Morgan, St. Petersburg, FL (US)

(73) Assignee: Honeywell International Inc., Charlotte, NC (US)

( * ) Notice: Subject to any disclaimer, the term of this patent is extended or adjusted under 35 U.S.C. 154(b) by 348 days.

(21) Appl. No.: 16/522,943

(22) Filed: Jul. 26, 2019

(65) Prior Publication Data

US 2021/0025710 A1    Jan. 28, 2021

(51) Int. Cl.
  *G01C 21/16*  (2006.01)
  *G01C 21/20*  (2006.01)
  *G01C 25/00*  (2006.01)

(52) U.S. Cl.
  CPC .............. *G01C 21/16* (2013.01); *G01C 21/20* (2013.01)

(58) Field of Classification Search
  CPC .......... B60W 30/025; B60W 50/0097; B60W 50/085; B60W 30/02; B60W 50/0098; B60W 50/10; B60W 40/09; B60W 50/0075; B60W 2556/10; B60W 2540/215; B60W 2552/15; B60W 2552/30; B60W 2552/35; B60W 2555/20; B60W 2556/50; B60W 2556/55; B60W 2510/22; B60W 2540/30; B60W 2050/0031; B60W 2520/10;
  (Continued)

(56) References Cited

U.S. PATENT DOCUMENTS 4,786,908 A   11/1988 Runnails
5,740,048 A    4/1998 Abel et al.
(Continued)

FOREIGN PATENT DOCUMENTS

CN   102737155 A   10/2012
EP     0771447 B1    2/2004
(Continued)

OTHER PUBLICATIONS https://citeseerx.ist.psu.edu/viewdoc/download?doi=10.1.1.466.1429&rep=rep1&type=pdf (Year: 2002).*
(Continued)

*Primary Examiner* — Abby Y Lin
*Assistant Examiner* — Hossam M Abd El Latif
(74) *Attorney, Agent, or Firm* — Fogg & Powers LLC

(57) ABSTRACT

Using geo-mapping data and only at least one inertial sensor, a Bayesian estimator uses at least one element of an uncorrected inertial navigation vector, of a moveable object on a surface, to estimate inertial navigation error information including corresponding statistical information. The estimated inertial navigation error information is used to error correct the uncorrected inertial navigation vector. The Bayesian filter also predicts inertial navigation error information, including corresponding statistical information, for a future time instance when a next uncorrected inertial navigation vector will be obtained.

20 Claims, 5 Drawing Sheets

(58) Field of Classification Search
CPC . B60W 2050/0029; B60W 2050/0033; B60W 2720/18; B60W 2710/202; B60W 2720/106; B60W 2510/202; B60W 2520/06; B60W 2520/105; B60W 2710/02; B60W 2710/0605; B60W 2710/10; B60W 2710/18; B60W 2710/20; B60W 2300/36; B60W 2540/18; B61L 2205/04; G01C 21/16; G01C 21/20; G01C 21/165; G01C 21/005; G01C 21/206; G01C 21/00; G01C 21/12; G01C 21/30; G01C 9/02
USPC .......................................................... 701/509
See application file for complete search history.

(56) References Cited

U.S. PATENT DOCUMENTS

| | | | |
|---|---|---|---|
| 7,188,048 B2 | 3/2007 | Kourilzin et al. | |
| 7,526,414 B2 | 4/2009 | Comaniciu et al. | |
| 7,724,184 B2 | 5/2010 | Waid | |
| 8,213,956 B2 | 7/2012 | Sirola et al. | |
| 8,566,032 B2 | 10/2013 | Chowdhary et al. | |
| 9,020,752 B2 | 4/2015 | Lundquist et al. | |
| 2003/0068097 A1 | 4/2003 | Wilson et al. | |
| 2004/0133927 A1 | 7/2004 | Sternberg et al. | |
| 2006/0293873 A1 | 12/2006 | Gardner et al. | |
| 2007/0192060 A1 | 8/2007 | Yam et al. | |
| 2010/0010956 A1 | 1/2010 | Bell et al. | |
| 2012/0022784 A1 | 1/2012 | Louis et al. | |
| 2014/0074397 A1* | 3/2014 | Vanderwerf | G01C 21/165 701/472 |
| 2014/0324339 A1 | 10/2014 | Adam et al. | |
| 2015/0279031 A1 | 10/2015 | Cavusoglu et al. | |
| 2015/0346333 A1 | 12/2015 | Soto et al. | |
| 2016/0235270 A1 | 8/2016 | Santini | |
| 2017/0160399 A1 | 6/2017 | Barrau et al. | |
| 2018/0165591 A1 | 6/2018 | Dunik et al. | |
| 2018/0205366 A1 | 7/2018 | Vesely et al. | |
| 2018/0340965 A1 | 11/2018 | Sotak et al. | |
| 2019/0033082 A1* | 1/2019 | Asai | G05D 1/0246 |
| 2021/0094595 A1* | 4/2021 | Kalberer | B61L 25/025 |

FOREIGN PATENT DOCUMENTS

| | | |
|---|---|---|
| EP | 1332336 B1 | 10/2012 |
| EP | 2706379 A1 | 3/2014 |
| WO | 2014092995 A1 | 6/2014 |
| WO | 2015183390 A1 | 12/2015 |

OTHER PUBLICATIONS

A Visual Navigation System for UAS Based on Geo-Referenced Imagery Gianpaolo Conte and Patrick Doherty (Year: 2011).*
"Non-Legislative Acts Regulations", Official Journal of the European Union, Legislation L 340,Dec. 24, 2015, pp. 1-308, vol. 58, Publication Office of the European Union.
"Strapdown inertial navigation", Rotations, at least as early as Jun. 28, 2019, pp. 1-6.
Alspach et al., "Nonlinear Bayesian Estimation Using Gaussian Sum Approximations", IEEE Transactions on Automatic Control, Aug. 1972, pp. 1-10, vol. AC-17, No. 4, IEEE.
Anonsen et al., "Terrain Aided AUV Navigation—A Comparison of the Point Mass Filter and Terrain Contour Matching Algorithms", Norwegian Defence Research Establishment (FFI), 2005, pp. 1-10, Kjeller, Norway.
Bergman et al., "Terrain Navigation Using Bayesian Statistics", IEEE Control Systems, Jun. 1999, pp. 1-8, IEEE.
Bergman, "Bayesian Inference in Terrain Navigation", Linkoping Studies in Science and Technology, Thesis No. 649, 1997, pp. 1-98, Linkoping University.
Bergman, "Point-mass filter and Cramer-Rao bound for Terrain-Aided Navigation", Department of Electrical Engineering, Nov. 5, 1997, pp. 1-7, Linkoping University.
Bergman, "Recursive Bayesian Estimation: Navigation and Tracking Applications", Department of Electrical Engineering, 1999, pp. 1-219, Linkoping University.
Conte et al., "A Visual Navigation System for UAS Based on GEO-Reference Imagery", International Archives of the Photogrammetry, Remote Sensing and Spatial Information Sciences, ISPRS Zurich 2011 Workshop, Aug. 14, 2011, pp. 1-6, vol. XXXVIII-1/C22, Artificial Intelligence and Integrated Computer System Division, Linkoping University.
Frykman, "Applied particle filters in integrated aircraft navigation", Automatic Control and Communication Systems, Apr. 28, 2003, pp. 1-78, Linkopings Universitet.
Grisetti et al., "Improved Techniques for Grid Mapping with Rao-Blackwellized Particle Filters", IEEE Transactions on Robotics, Mar. 2007, pp. 1-13, IEEE.
Groves, "Navigation Using Inertial Sensors", IEEE Aerospace and Electronic Systems Magazine, 2013, pp. 1-51, Tutorial submission to IEEE AESS Systems Magazine.
Gustafsson et al., "Particle Filters for Positioning, Navigation, and Tracking", IEEE Transactions on Signal Processing, Feb. 2002, pp. 1-13, vol. 50, No. 2, IEEE.
Gustafsson, "Particle Filter Theory and Practice with Positioning Applications", IEEE A & E Systems Magazine, Jul. 2010, pp. 1-30, vol. 25, No. 7, IEEE.
Hektor et al., A Marginalized Particle Filter Approach to an Integrated INS/TAP System, IEEE, 2008, pp. 1-5, Sweden.
Ivanov et al., "Evaluating the Consistency of Estimation", Proceedings of 2014 International Conference on Localization and GNSS (ICL-GNSS), Jun. 24-26, 2014, pp. 1-6, IEEE.
Jeon et al., "Nonlinear aircraft tracking filter utilizing a point mass flight dynamics model", Proceedings of the Institution of Mechanical Engineers Part G, Nov. 2013, pp. 1-17, Journal of Aerospace Engineering.
Li et al., "Survey of Maneuvering Target Tracking. Part I: Dynamic Models", IEEE Transactions on Aerospace and Electronic Systems, Oct. 2003, pp. 1333-1364, vol. 39, No. 4, IEEE.
Nordlund, "Sequential Monte Carlo Filters and Integrated Navigation", Linkoping Studies in Science and Technology, 2002. pp. 1-114, Division of Automatic Control, Department of Electrical Engineering, Linkoping University.
Pineiro et al., "How to evaluate models: Observed vs. predicted or predicted vs. observed?", Ecological Modelling 216, Jul. 2, 2008, pp. 1-8, Elsevier.
Rogers, "Applied Mathematics in Integrated Navigation Systems", 2007, pp. 102-113, American Institute of Aeronautics and Astronautics, Inc.
Schon et al., "Marginalized Particle Filters for Mixed Linear/Nonlinear State-Space Models", IEEE Transactions on Signal Processing, Jul. 2005, pp. 1-11, vol. 53, No. 7, IEEE.
Simandl et al., "Advanced point-mass method for nonlinear state estimation", Automatica 42, Mar. 20, 2006, pp. 1133-1145, ELSEVIER.
Simandl et al., "Anticipative Grid Design in Point-Mass Approach to Nonlinear State Estimation", IEEE Transactions on Automatic Control, Apr. 2002, pp. 699-702, vol. 47, No. 4, IEEE.
Sirola, "Mathematical Methods for Personal Positioning and Navigation", Tampere University of Technology, 2007, pp. 1-125, Publication 675, Tampere.
Smidl et al., "Rao-Blackwellized Point Mass Filter for Reliable State Estimation", 16th International Conference on Information Fusion, Jul. 9, 2012, pp. 1-7, ISIF.
Straka et al., "Performance diagnosis of local filters in state estimation of nonlinear systems", European Workshop on Advanced Control and Diagnosis, 2014, pp. 1-12, Journal of Physics: Conference Series 570.
Wibowo et al., "Rao-Blackwellized Particle Filter for Pattern Matching Indoor Localisation", NIMBUS Centre for Embedded Systems Research, Cork Institute of Technology, 2010, pp. 1-6, IEEE.
Yoo et al., "Improvement of Terrain Referenced Navigation using a Point Mass Filter with Grid Adaptation", International Journal of

(56) References Cited

OTHER PUBLICATIONS

Control, Automation, and Systems (2015), Publisher ICROS, KIEE and Springer 2015, pp. 1173-1181.

European Patent Office, "Extended European Search Report from EP Application No. 20186802.3", from Foreign Counterpart to U.S. Appl. No. 16/522,943, filed Dec. 16, 2020, pp. 1 through 9, Published: EP.

Norlund "Sequential Monte Carlo Filters and Integrated Navigation", Linkoping Studies in Science and Technology Thesis No. 945, 2002, pp. 1 through 114, Division of Automatic Control Department of Electrical Engineering.

European Patent Office, "Communication pursuant to Article 94(3) from EP Application No. 20186802.3", from Foreign Counterpart to U.S. Appl. No. 16/522,943, filed Jan. 18, 2022, pp. 1 through 4, Published: EP.

\* cited by examiner

APPARATUS AND METHOD FOR TERRAIN AIDED NAVIGATION USING INERTIAL POSITION

BACKGROUND

When position data from a global navigation satellite system (GNSS) is unavailable, a parameter, associated with a position of a moveable object over a known surface may be computed on the basis of the inertial measurements and measurements from one or more other sensors, e.g. an altimeter or odometer. The known surface may be represented by a terrain map. However, some moveable objects do not include the one or more other sensors. Therefore, there is a need to determine position of the moveable object without use of such sensors and the GNSS.

Lacking other sensor(s), an inertial navigation system (INS) outputs an uncorrected inertial navigation vector having error(s) which increase with time, i.e. the uncorrected inertial navigation vector diverges from true navigation information. To reduce such error(s), the moveable object may have to periodically stop to calibrate out error(s) in the INS, e.g. the accelerometers and/or gyroscopes of an inertial measurement unit (IMU) of the INS[1], using, e.g. the technique known as a zero-velocity update. Requiring a moveable object to periodically stop is undesirable because not only does it interrupt the moveable object's travel but also may make the moveable object susceptible to damage, e.g. due to collisions.

[1] An INS generates a moveable object's an uncorrected inertial navigation vector typically in the form of an estimated object's uncorrected inertial position vector, uncorrected inertial velocity vector, and uncorrected inertial attitude and heading vector, using inertial navigation equations based upon measured proper accelerations in and angular rotation rates about one or more axes. The uncorrected inertial position vector, the uncorrected inertial velocity vector, and the uncorrected inertial attitude and heading vector may also be referred to respectively as a position state variable, a velocity state variable, and an attitude and heading state variable. The INS comprises one or more IMUs (IMU(s)). Each IMU includes one or more accelerometers and/or one or more gyroscopes. An accelerometer measures the moveable object's acceleration in one axis of the moveable object. A gyroscope measures the moveable object's angular rate of rotation about one axis of the moveable object. Although IMU(s) are illustrated herein for pedagogical purposes, inertial sensor(s) may be used more generally in lieu of the IMU(s).

SUMMARY

A method for more accurately determining at least position of a moveable object on a terrestrial surface of a celestial body with geo-mapping data and only at least one inertial sensor is provided. The method comprises: initializing a Bayesian estimator with an a priori estimate of statistical information of an initial current uncorrected inertial navigation vector; receiving, for a current time instance, uncorrected inertial navigation vector for the moveable object on the terrestrial surface of the celestial body; for the current time instance, estimate inertial navigation error information, including corresponding statistical information, using the Bayesian estimator with at least one element of an uncorrected inertial navigation vector and the geo-mapping data; for a current time instance, estimating inertial navigation error information using the Bayesian estimator; error correcting the uncorrected inertial navigation vector, with the estimated inertial navigation error information, for the current time instance; and predicting, using the Bayesian estimator, inertial navigation error information, including corresponding statistical information, for a future time instance when a next uncorrected inertial navigation vector will be obtained.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
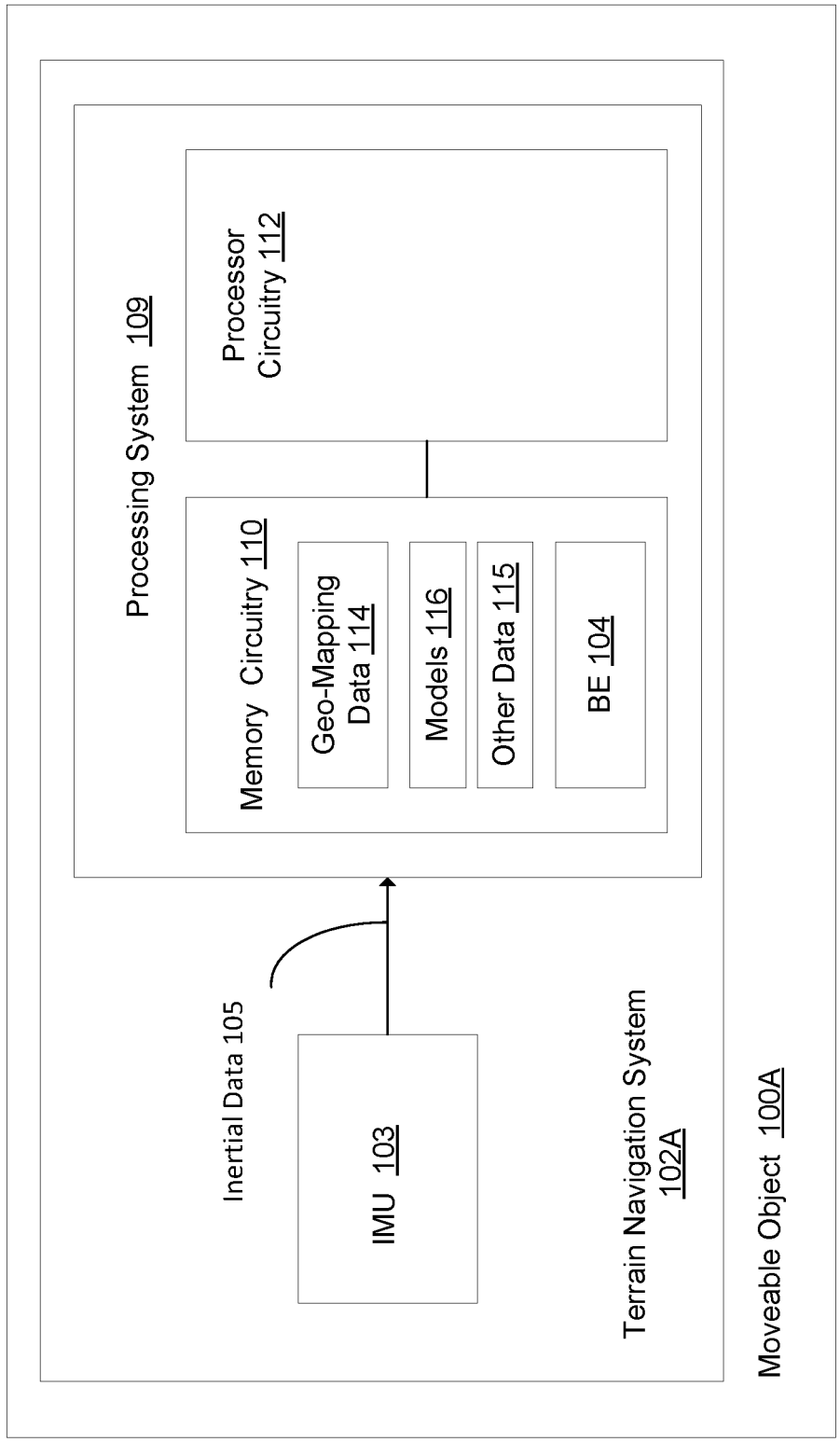
FIG. 1A illustrates a block diagram of an exemplary moveable object that includes a terrain navigation system according to the closed loop embodiment.

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the invention perform terrain aided navigation using at least only one inertial sensor, geo-mapping data, and a Bayesian estimator. The Bayesian estimator may be a Rao-Blackwellized Point Mass Filter (RBPMF)[2], a Rao-Blackwellized Particle Filter, a Particle Filter, a Kalman filter, and/or any other Bayesian estimator. For pedagogical purposes, the Bayesian estimator may be described as a RBPMF.

[2] A Rao-Blackwellized point mass filter (RBPMF) is an estimator that is an extension of a point mass filter, and permits a state variable estimation for a model decomposed into non-linear state equation(s) and linear state equation (s). The non-linear state equation(s) can be solved by a standard point mass filter. The linear state equation(s) can be solved by one or more linear estimators, i.e. one or more Bayesian filters (BFs), which are much more computationally efficient. In one embodiment, the Bayesian filter(s) are Kalman filter(s). The term Kalman filter(s) shall include all variations of Kalman filter(s), including for example extended Kalman filter(s). This decomposition, therefore, significantly reduces the computational requirements of the point mass filter as the corresponding non-linear state equation(s) have fewer variables. As a result, the Rao-Blackwellized point mass filter can estimate, with typical data processing systems, a navigation error vector with much less computational resources than the standard point mass filter alone. One example of a terrain navigation system using a Rao-Blackwellized point mass filter and another sensor, e.g. an altimeter, is described in in U.S. Patent Publication 2018/0165591A1 (the '591 Publication) which is incorporated by reference herein in its entirety.

Inertial data means some or all data provided from at least one inertial sensor, e.g. in an IMU, which is at least one proper acceleration in one axis and/or at least one angular rotation rate about one axis. The inertial data is subject to time correlated errors, e.g. arising from the inertial sensor(s). Two embodiments of terrain aided navigation in a GNSS denied environment are disclosed herein for pedagogical purposes: a closed loop embodiment and an open loop embodiment. Each embodiment may be used to determine a position of a moveable object on a known surface. A moveable object may be a living entity or inanimate object (e.g. a vehicle).

The closed loop and open loop embodiments differ with respect to the location of inertial navigation equations (INE). In the open loop system, the INE are part of an INS, e.g. pre-exiting or separately installed in the moveable object. In the closed loop system, the INE are part of a processing system added to and not pre-existing in the moveable object; the INE are coupled to inertial sensor(s), e.g. IMU(s). Such IMU(s), for example, may be pre-existing or separately installed in the moveable object.

Thus, in the closed loop embodiment, a Bayesian estimator has access to inertial data from inertial sensor(s). However, in the open loop embodiment, the Bayesian estimator has access only to uncorrected inertial navigation vectors from the INS.

Thus, for the closed loop embodiment, terrain aided navigation is performed by estimating (with the Bayesian estimator) inertial navigation error information using an uncorrected inertial navigation vector (for a moveable object on a terrestrial surface of a celestial body), and proper acceleration and angular rotation rate data provided from at least one inertial sensor, e.g. an IMU.[3] In exemplary closed loop embodiments, the inertial data is proper acceleration and angular rotation rate data for each of three orthogonal axes, and the uncorrected inertial navigation vector. In exemplary open loop embodiments, terrain aided navigation is performed by estimating (with the Bayesian estimator) inertial navigation error information using only the uncorrected inertial navigation vector (for a moveable object on a terrestrial surface of a celestial body), e.g. only an uncorrected inertial position vector.

[3] Inertial navigation vector means position vector, velocity vector, heading, and attitude vector. Heading means a direction in which the moveable object is pointing. Attitude vector consists of roll and pitch elements. The attitude vector and heading may also be referred to as the attitude and heading vector or the orientation vector. Uncorrected inertial navigation vector means a navigation vector that has not been corrected for time correlated errors, e.g. arising in the inertial data generated by an IMU and which is processed using an INE of an INS. Error corrected navigation information means an uncorrected inertial navigation vector having one or more elements corrected for time correlated errors, and optionally includes statistical information, e.g. in the form of a mean and standard deviation or probability density function (PDF) for such corrected element(s). For example, elements of an uncorrected inertial navigation vector which may be corrected are: (a) an uncorrected inertial position vector; (b) the uncorrected inertial position vector and an uncorrected inertial velocity vector; and (c) the uncorrected inertial position vector, the uncorrected inertial velocity vector, and an uncorrected inertial attitude and heading vector. The time correlated errors, for example, may arise from biases and noise in an INS, IMU(s), and/or inertial sensor(s). An inertial sensor is a gyroscope or accelerometer.

The inertial navigation error information comprises errors in one or more elements of an uncorrected inertial vector, e.g. uncorrected inertial position vector, and possibly at least one of: an uncorrected inertial velocity vector and an uncorrected inertial attitude and heading vector. The uncorrected inertial navigation vector, generated by an INE, means an uncorrected inertial position vector, an uncorrected inertial velocity vector, and an uncorrected inertial attitude and heading vector.

The inertial navigation error information includes statistical information about such at least one of such one or more elements of the uncorrected inertial navigation vector. The statistical information, for example, comprises mean and standard deviation. Optionally, the statistical information comprises a probability density function from which the mean and standard deviation can be obtained. In some embodiments, the standard deviation may be described in the form of a co-variance matrix. In further embodiments, the statistical information may include other moments, e.g. skewness, kurtosis, and higher order moments.

The inertial position vector is the position of the moveable object with respect to a relative frame of reference having three orthogonal axes. The relative frame of reference may be, for example, the terrestrial surface upon which the moveable object is located. The inertial velocity vector is the velocity of the moveable object along each of such orthogonal axes. The inertial attitude and heading vector is an orientation of the moveable object with respect to a relative frame of reference. For pedagogical purposes, sets of axes are illustrated herein as being orthogonal; however, such sets of axes need not be orthogonal.

For the closed loop embodiment, inertial navigation equations generate an uncorrected inertial navigation vector (for a moveable object on a terrestrial surface of a celestial body) based upon proper acceleration and angular rotation rate data, e.g. from an IMU. The uncorrected inertial navigation vector is affected by time-correlated error(s), which can grow with time and are caused by, e.g. noise in inertial data. The estimate of the inertial navigation error information is used to correct the time correlated error(s) in elements of the inertial position vectors (and possibly at least one of: the velocity vector and attitude and heading vector). The inertial navigation error information is estimated by the Bayesian estimator using inertial data, an error-state INE (ESINE), geo-mapping data, and the uncorrected inertial navigation vector (or elements thereof). The ESINE and the geo-mapping data form a conditionally linear error-state state-space model used by the Bayesian estimator. The state-space model is formed by the state and measurement equation.

In particular, the ESINE is a state equation in the error-state form. One example of the ESINE state equation is:

$$\delta x_{k+1} = \begin{bmatrix} \delta x_{k+1}^n \\ \delta x_{k+1}^l \end{bmatrix} = \begin{bmatrix} F_k^n & F_k^{nl} \\ F_k^{ln} & F_k^l \end{bmatrix} \delta x_k + G_k w_k \quad \text{(Equation 1)}$$

(state equation)

$\delta x_{k+1}$ is inertial navigation error information at time index k+1, $\delta x_{k+1}^n$ is a non-linear component of the inertial navigation error information at time index k+1, e.g. related to the moveable object's horizontal position, $\delta x_{k+1}^l$ is a linear component of the inertial navigation error information at time index k+1, $F_k^n$, $F_k^l$, $F_k^{nl}$, and $F_k^{ln}$ are known system matrices describing the non-linear part of the state equation, linear part of the state equation, and relations between linear and non-linear parts of the model, respectively, which, e.g. dependent upon element(s) of the uncorrected inertial navigation vector and/or are constant(s), $G_k$ is a known state noise scaling matrix, e.g. dependent upon element(s) of the uncorrected inertial navigation vector and/or are constant(s), $w_k$ is unknown noise in the state equation which quantifies uncertainty in the state equation and input vector. The statistical information, e.g. a PDF, of $w_k$ is known. For example, it may be a Gaussian variable with zero mean and a known covariance matrix.

The exemplary ESINE of Equation 1 is derived from the subsequently illustrated INE. An example of the INE in the form of differential equations for position, velocity, attitude, and heading are $\dot{r}^i = \Omega_{i/e}{}^i r^i + C_n{}^i v^n$ $\dot{v}^n = C_b{}^n f^b - (\Omega_{e/n}{}^n + 2\Omega_{i/e}{}^n) v^n + g^n$ $$\dot{C}_b^n = \Omega_{b/n}^n C_b^n \quad \text{(Equation 2)}$$

where superscript n means navigation frame, b means body frame, superscript i means non-rotating inertial frame, and superscript e means rotating Earth-centered Earth-fixed frame, r is an object position, v is an object velocity, and $C_b^n$ is a rotation (or directional cosine) matrix describing orientation of frames b and n, $f^n$ is a specific force being sensed by accelerometers, $g^n$ is the gravity field vector, and $\Omega_{i/e}^n$ is a skew-symmetric matrix of the vector $\omega_{i/e}^n$ describing angular rate of e frame with respect to i frame sensed form n frame. Note that the angular rate $\omega_{i/e}^n$ is a linear function of the angular rate $\omega_{i/b}^b$, which is sensed by the gyroscope.

To be implemented in a Bayesian estimator, the INE (used to derive the ESINE and which is non-linear and continuous model) may be approximated by a linearized and discrete model. For example, the ESINE may be approximated in a discrete and linear form using a Taylor expansion of a first order of Equation 2 along the reference trajectory which can be based e.g., on the INE output denoted as $x_k^{INE}$. The state equation is used in prediction (time-update) step of the Bayesian estimator. Note, that other approximations, such as Taylor or Stirling expansion of higher order, may be used in the alternative.

The measurement equation, used in the filtering (measurement step) of the RBPMF $$\begin{aligned} z_k &= h(x_k^n) + H x_k^l + v_k \quad \text{(Equation 3)} \\ &= h(x_k^{INE,n} + \delta x_k^n) + H(x_k^{INE,l} + \delta x_k^l) + v_k \end{aligned}$$

(measurement equation)

where
- $z_k$ is vertical position of the movable object at time index k determined by the INE,
- h( ) is a known non-linear function representing the geo-mapping data. The function transforms from a horizontal position vector to a terrain elevation. The function can vary over time,
- $x_k^{INE,n}$ is a linear component of uncorrected inertial navigation vector (e.g. element(s) of the uncorrected inertial position vector),
- $x_k^{INE,l}$ is a non-linear component of the uncorrected inertial navigation vector (e.g. element(s) of the uncorrected inertial velocity vector and the uncorrected inertial attitude, and heading vector),
- H is a known matrix in the measurement equation relating the linear component of the state vector and the measurement. In one embodiment, the matrix can vary over time, and
- $v_k$ is unknown noise in the measurement equation that quantifies all uncertainty in the measurement equation, e.g. data provided from the IMU and/or the INS, and/or uncertainty in the geo-mapping data. The statistical information, e.g. a PDF, of the unknown noise is known. For example, it may have a Gaussian distribution with zero mean and known covariance matrix.

The geo-mapping data serves as a navigation aid in a GNSS denied environment. The closed-loop embodiment can be thus viewed as a stand-alone closed-loop integrated inertial navigation system, where the aiding (measurement update) is realized with the geo-mapping data. The aiding compares a vertical position (derived by transforming uncorrected inertial horizontal position with the geo-mapping data) with the uncorrected inertial vertical position. Based upon the comparison, the inertial navigation information is corrected and consequently, the magnitude of error of the inertial navigation error information does not grow in time and is bounded (if geo-mapping data is sufficiently varying).

The open loop embodiment is intended as an additional system coupled to an existing INS and which bounds the magnitude of error of the inertial navigation information error. Typically, the open loop implementation of the navigation system does not have access to the inertial data. The inertial navigation information error vector is then estimated by a Bayesian estimator using a dynamic state-space model, geo-mapping data, and the uncorrected navigation vector (or elements thereof). The dynamic model and the geo-mapping data form the conditionally linear state-space model used by the Bayesian estimator. The state-space model is formed by the state and measurement equation and it can be in full-state or error state form.

The dynamic model forms the state equation and can have multiple forms, e.g., a nearly constant velocity model, or a nearly constant acceleration model. The selected model is chosen based upon the expected movement of the moveable object.

In the open loop embodiment, the measurement equation is also formed, at least in part, by the geo-mapping data. The measurement $z_k$ is vertical position of the movable object at time index k determined by the INE and is compared with the inertial vertical position transformed via the map $h(x_k^n)$.

The closed loop embodiment can be more accurate than the open loop embodiment because of a tightly coupled integration of the INS and the geo-mapping data. In this case, all the available data may be optimally processed, and the navigation system can take advantage of available inertial measurements. The open loop embodiment typically does not have access to the inertial data and thus it must typically rely upon only the dynamic model describing the object motion approximatively.

In the open loop embodiment, time correlated errors in the INS progressively increase with time, and are corrected by an output of the Bayesian estimator using the geo-mapping data. However, in the closed loop embodiment, time correlated errors arising from the IMU are diminished to substantially zero each time the Bayesian estimator, using the geo-mapping data, estimates a navigation error vector.

For pedagogical purposes, the closed loop embodiment of the invention is illustrated with an IMU to provide proper acceleration in and angular rotation rate about one or more axes, e.g. of a moveable object. The IMU comprises accelerometer(s) and/or gyroscope(s). Optionally, the IMU may have three gyroscopes and three accelerometers, where each of a pair of a gyroscope and an accelerometer measure the force in and rotation rate around one of the three orthogonal axes of the moveable object. However, the inertial sensor(s) may be used in lieu of the IMU.

FIG. 1A illustrates a block diagram of an exemplary moveable object 100A that includes a terrain navigation system 102A according to the closed loop embodiment. The terrain navigation system 102A is, e.g. mounted on or in the moveable object 100A. The terrain navigation system 102A comprises a processing system (or processing circuitry) 109 coupled to inertial sensor(s) represented by an IMU 103. The IMU 103 generates measured data: proper accelerations in and/or angular rotation rates about one or more orthogonal axes.

The processing system 109 is configured to receive the measured data from the IMU 103. The processing system 109 comprises a Bayesian estimator (BE) 104, geo-mapping data 114, at least one model (model(s)) 116, and is configured to store other data 115. For this closed loop embodiment, the other data 115 may include the inertial data generated by and received from the IMU 103, element(s) of an uncorrected inertial position vector, uncorrected inertial velocity vector, and/or uncorrected inertial attitude and heading vector generated by and received from the INE, the error corrected navigation information, and/or the inertial navigation error information.

The model(s) 116 comprise the INE. The inertial navigation equations transform an acceleration vector and an angular rotation rate vectors provided by the IMU 103 into a position vector, a velocity vector, and an attitude and heading vector. The position vector, the velocity vector, and the attitude and heading vector are each a three dimensional vector. Optionally, the model(s) 116 comprise an error correction unit, and/or model(s) of the IMU 103, or of its constituent inertial sensor(s). Optionally, for the closed loop embodiment, the error correction unit may be part of the INE.

The processing system 109 may be implemented as a state machine, a neural network, or in another form. For pedagogical purposes, the processing system 109 is illustrated in each of FIGS. 1A and 1B as comprising memory circuitry 110 coupled to processor circuitry 112. The Bayesian estimator 104, the geo-mapping data 114, the other data 115, and the model(s) 116 are illustrated as stored in the memory circuitry 110. The processor circuitry 112 is configured to execute the Bayesian estimator 104 as described herein to estimate the inertial navigation error information.

The inertial navigation error information, provided by the Bayesian estimator 104, is used to error correct element(s) of the uncorrected inertial position vector, elements of the uncorrected inertial position vector and the uncorrected inertial velocity vector, and/or elements of the uncorrected inertial position vector, the uncorrected inertial velocity vector, and the uncorrected attitude and heading vector generated by the INE. The error corrected navigation information is generated by error correcting element(s) of the uncorrected inertial navigation vector with the inertial navigation error information.

The error correction unit is configured to perform such error correction of element(s) of the uncorrected inertial navigation vector of the INE. Alternatively, the processing circuitry 112 is configured to directly perform the error correction function.

Element(s) of the uncorrected inertial position vector are error corrected by corresponding error element(s) of the inertial navigation error information. Optionally, element(s) of the uncorrected inertial velocity vector are error corrected by corresponding error element(s) of the inertial navigation error information. Optionally, element(s) of the uncorrected inertial attitude and heading vector of the uncorrected navigation vector are error corrected by corresponding error element(s) of the inertial navigation error information.

For each of the aforementioned element(s) of the uncorrected inertial navigation vector and of the inertial navigation error information in cartesian coordinates, the error correction is performed by adding or subtracting error element(s) of the inertial navigation error information respectively to and from the corresponding element(s) of the uncorrected inertial navigation vectors. For each of the aforementioned element(s) of the uncorrected inertial navigation vector and of the inertial navigation error information in polar coordinates, the error correction can be performed by multiplying or dividing the error element(s) of the inertial navigation error information respectively by and into the corresponding element(s) of the uncorrected inertial navigation vectors.

Optionally, the error corrected navigation information comprises statistical information for each error corrected element using the inertial navigation error information. For example, when the Bayesian estimator 104 is a RBPMF, the standard deviation of an element of the error corrected navigation information can be derived from the PDF of the corresponding element the inertial navigation error information. The mean of the element of the error corrected navigation information can be determined from difference between a mean (derived from the PDF of the corresponding element the inertial navigation error information) and the corresponding element of the uncorrected inertial navigation vector.

The geo-mapping data 114 is a representation of terrain elevation or gravity fields, with terrain elevation and gravity field strength mapped as a function of terrain surface horizontal position. The processing system 109 is configured to use the geo-mapping data 114 to transform a non-linear component of navigation error vector which is error corrected by the horizontal position elements of the navigation error vector to a terrain elevation. Such terrain elevation is also used by the RBPMF 104 to estimate the navigation error vector.

Optionally, the geo-mapping data 114 represents horizontal position by latitude and longitude. Optionally, terrain elevation as used through this document is referenced to mean sea level.

Optionally, the geo-mapping data 114 is a digitized map. Optionally, the geo-mapping data 144 is stored in the form of a database, where terrain elevation is indexed by horizontal position. Optionally, the geo-mapping data 114 is represented by equation(s) with terrain elevation as the independent variable, and horizontal position of the moveable object as the dependent variable(s).

Figure 1B:
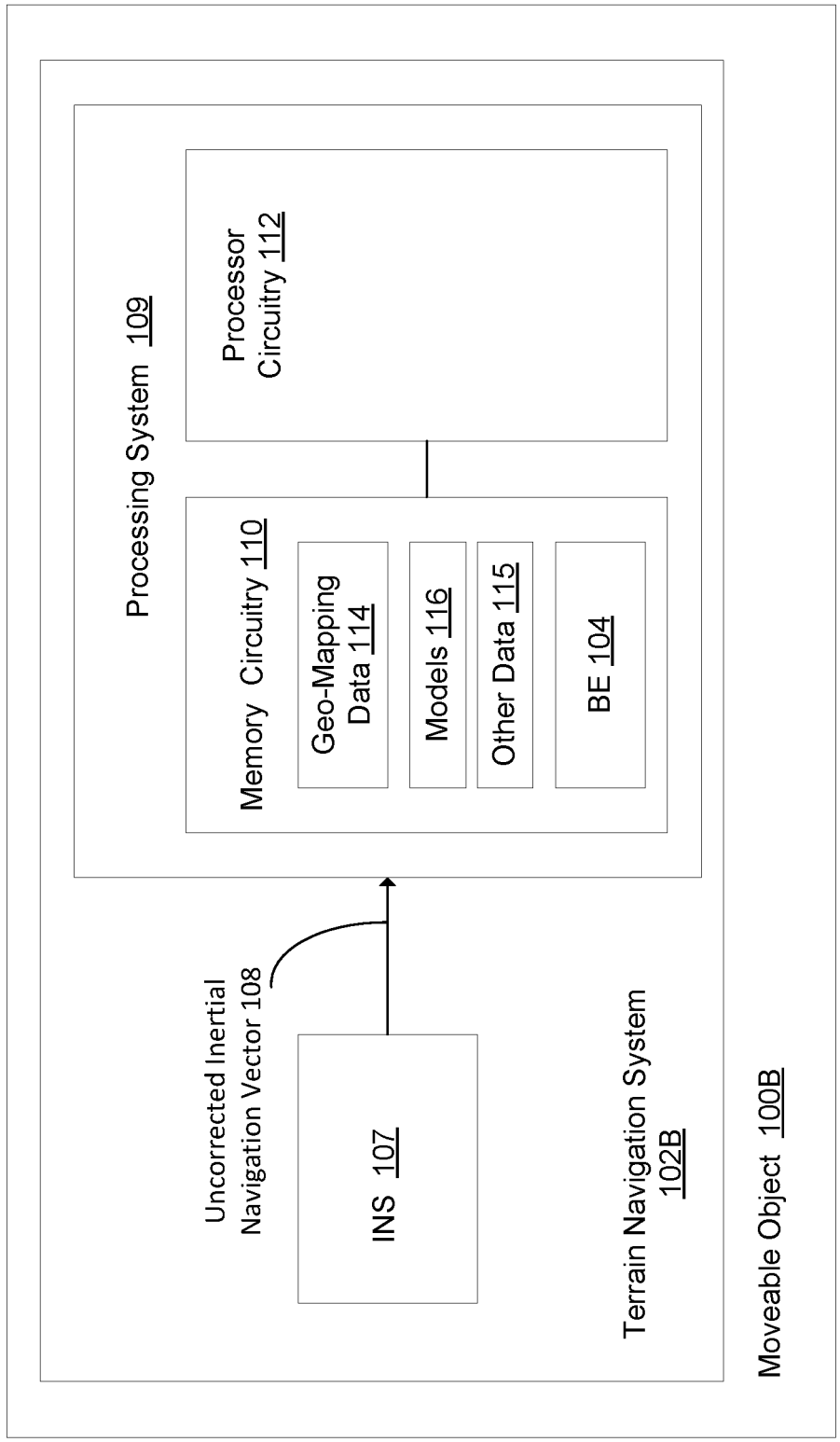
FIG. 1B illustrates a block diagram of an exemplary moveable object that includes a terrain navigation system according to the open loop embodiment.

FIG. 1B illustrates a block diagram of an exemplary moveable object 100B that includes a terrain navigation system 102B according to the open loop embodiment. The terrain navigation system 102B of FIG. 1B differs from the terrain navigation system 102A of FIG. 1A in that the IMU 103 is replaced by an INS 107. Further, inclusion of the model(s) 116 in the processing system 109 is optional. For the open loop embodiment, the optional model(s) 116 comprise models of the INS 103, or of its inertial sensor(s); the model(s) 116 do not include inertial navigation equations as those part of the INS 107. Also, the INS 107 is configured to provide, and the processing system 109 is configured to receive, an uncorrected inertial navigation vector 108. Thus, the processing system 109 is configured to store such uncorrected inertial navigation vector (or elements thereof) 108, e.g. in the other data 115. For this open loop embodiment, the other data 115 also includes error corrected navigation information, and/or inertial navigation error information. Otherwise, the open loop embodiment operates similarly to the closed loop embodiment.

In some embodiments, the Bayesian estimator is an RBPMF. The estimated navigation information parameters are represented by probability density functions (PDFs) which are typically continuous functions. However, because modern computation systems operate discretely, the PDFs may also be discretized. Thus, a continuous PDF $p_x(x)$ having an independent variable x may be approximated by a grid of equally spaced points $\xi^{(i)}$, $i=1, \ldots, N$, to create an approximate discretized PDF of the random scalar variable x:

$$p_x(x) \cong \sum_{i=1}^{N} P^{(i)}(\xi^{(i)}) S\{x:\xi^{(i)}, \delta\}, \quad \text{(Equation 4)}$$

where $P^{(i)}(\xi^{(i)}) = p_x(\xi^{(i)})$, $\delta$ is the distance between two adjacent points defining resolution of the grid points, i.e., $\delta = \xi^{(i)} - \xi^{(i-1)}$, and $S\{x: \xi^{(i)}, \delta\}$ is a selection function defined as:

$$S\{x:\xi, \delta\} = 1\left[x - \left(\xi - \frac{\delta}{2}\right)\right] - 1\left[x - \left(\xi + \frac{\delta}{2}\right)\right] \quad \text{(Equation 5)}$$

with $1[\cdot]$ being a unit step function defined for a scalar variable y as:

$$1[y] = 1, \ y \geq 0 \quad \text{(Equation 5)}$$
$$= 0, \text{ otherwise.}$$

The selection function $S\{x: \xi, \delta\}$ has a value 1 in if $$x \in \left(\xi - \frac{\delta}{2}, \xi + \frac{\delta}{2}\right),$$

otherwise, it has a value 0. The integral of the selection function is:

$$\int S\{x:\xi,\delta\} dx = \Delta. \quad \text{(Equation 6)}$$

For vector variables, the selection function, the vicinity $\delta$ of a grid point $\xi^{(i)}$, and the volume $\Delta$ are defined analogously.

Figure 2:
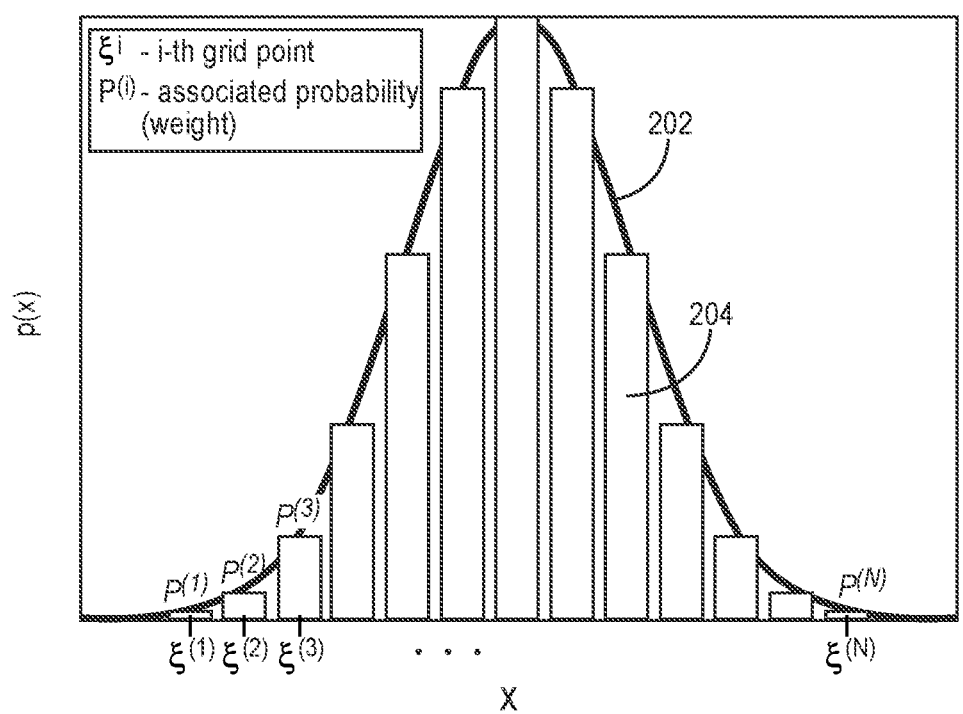
FIG. 2 illustrates an exemplary continuous probability density function and an exemplary discretized probability density function.
Figure 3:
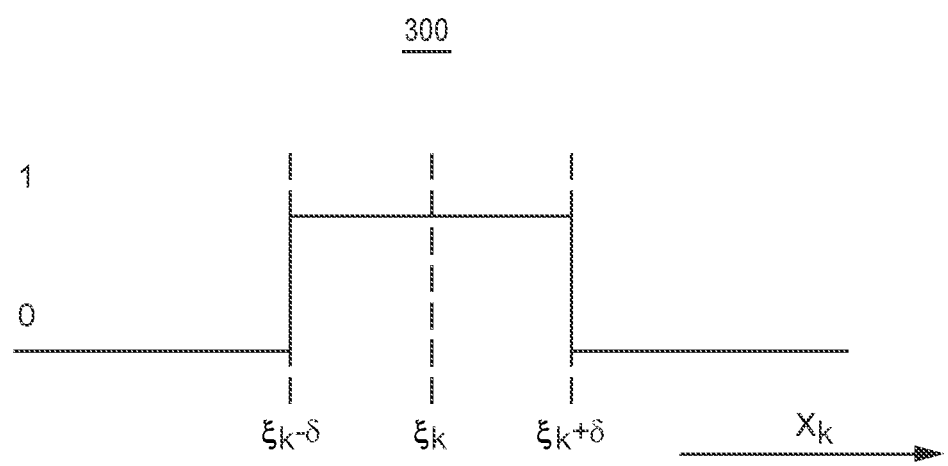
FIG. 3 illustrates an exemplary grid point selection function.

FIG. 2 illustrates an exemplary continuous PDF 202 and an exemplary discretized PDF 204, e.g. applicable for when the Bayesian estimator 104 is an RBPMF. FIG. 3 illustrates an exemplary grid point selection function 300, e.g. applicable for when the Bayesian estimator 104 is an RBPMF.

Figure 4:
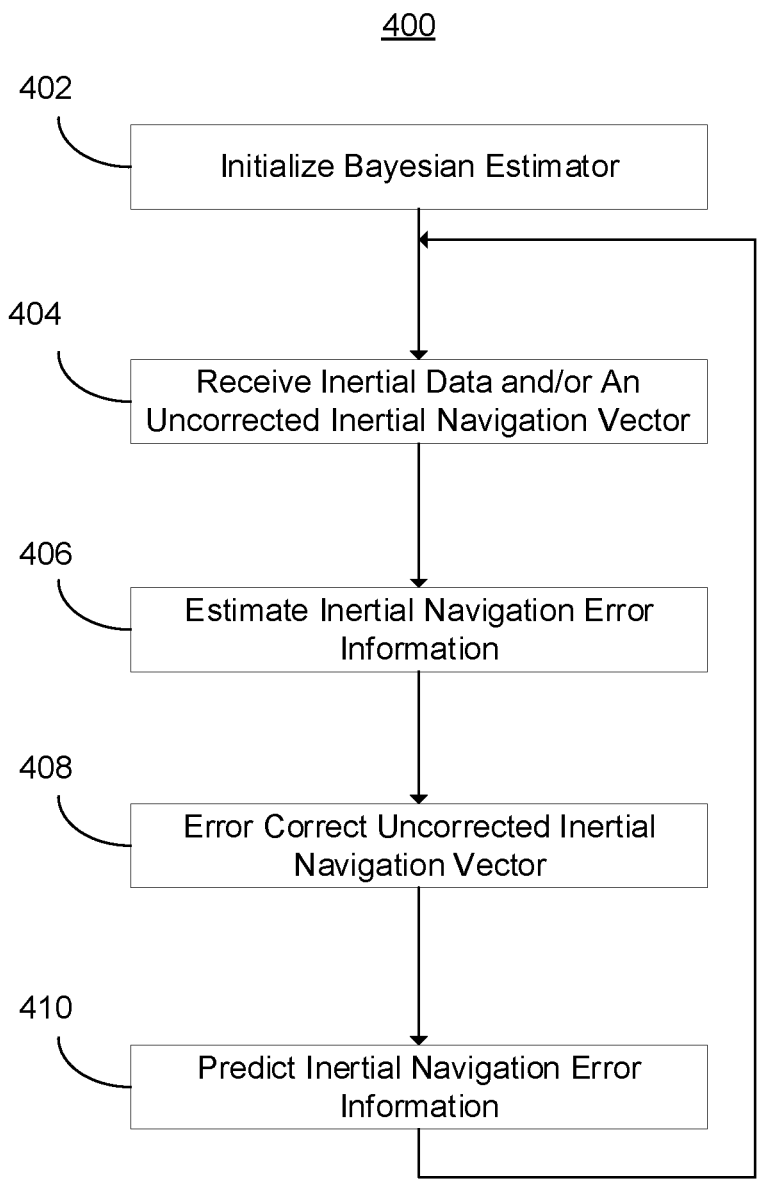
FIG. 4 illustrates an exemplary method of terrain aided navigation using only inertial data, geo-mapping data, and a Rao-Blackwellized Point Mass Filter.

FIG. 4 illustrates an exemplary method 400 of terrain aided navigation using only inertial data, geo-mapping data, and a Bayesian estimator. To the extent that the method 400 shown in FIG. 4 is described herein as being implemented by the systems shown in FIGS. 1A and 1B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 402, initialize the Bayesian estimator with an a priori estimate of statistical information of an initial current uncorrected inertial navigation vector, e.g. at time instance k=0. Optionally, the a priori statistical information may be provided by a person or a system, e.g. based upon INS and/or GNSS receiver data.

If the Bayesian estimator is a RBPMF, then optionally, initialization of block 402 is performed as follows. For time instant k=0, the initial PDF $p(x_0|z^{-1}) = p(x_0) = p(x_0^n, x_0^I)$ is approximated by the point-mass density evaluated at a set of N grid points $\{\xi_0^{(i)}\}_{i=1}^{N}$. The point-mass density is of the form:

$$\hat{p}(x_0|z^{-1}; \xi_0) = \Sigma_{i=1}^{N} P_{0|-1}(\xi_0^{(i)}) S\{x_0^n; \xi_0^{(i)}, \Delta_0\} N\{x_0^I; \hat{x}_{0|-1}^{I(i)}, P_{0|-1}^{(i)}\} \quad \text{(Equation 7)}$$

where $P_{0|-1}(\xi_0^{(i)})$ is a normalized value of $p(x_0|z^{-1})$ evaluated at grid point $\xi_0^{(i)}$, $S\{x_0^n; \xi_0^{(i)}, \Delta_0\}$ is the selection function defined above with grid point vicinity volume $\Delta_0$, and $N\{x_0^I; \hat{x}_{0|-1}^{I(i)}, P_{0|-1}^{(i)}\}$ is a Gaussian PDF of $x_0^I$ with a mean $\hat{x}_{0|-1}^{I(i)}$ and a covariance matrix $P_{0|-1}^{(i)}$.

In block 404, receive, at a current time instance, an uncorrected inertial navigation vector (e.g. from an INE). Optionally, at the current time instance receive inertial data (e.g. from an IMU) which can be used to generate the uncorrected inertial navigation vector, e.g. with an INE.

In block 406, for the current time instance, estimate inertial navigation error information (including corresponding statistical information) using the Bayesian estimator with at least one element of the uncorrected inertial navigation vector (e.g. from an INE), and geo-mapping data. Optionally, the inertial navigation error information is estimated also using the inertial data. Optionally, a predicted inertial navigation error information including corresponding statistical information (if provided by a previously performed block 410) is used to determine the estimate. Optionally, the estimated inertial navigation error information is in the form of a discretized PDF. Optionally, the horizontal position estimate is determined by determining a filtered point mass PDF of the estimated horizontal position, e.g. of the moveable object, using a Bayesian estimator that is a RBPMF, based upon the determined inertial vertical position, $z_k$, e.g. of the moveable object, and the measurement equation, where the filtered point mass PDF, $\hat{p}(x_k|z^k; \xi_k)$, at time instant k is:

$$\Sigma_{i=1}^{N} P_{k|k}(\xi_k^{(i)}) S\{x_k^n; \xi_k^{(i)}, \Delta_k\} N\{x_k^I; \hat{x}_{k|k}^{I(i)}, P_{k|k}^{(i)}\} \quad \text{(Equation 8)}$$

In block 408, error correct an uncorrected inertial navigation vector of the moveable object, with the estimated inertial navigation error information, for a current time.

In block 410, predict, using the Bayesian estimator, inertial navigation error information (including corresponding statistical information) for a next, future time instance (k+1) when the next uncorrected inertial navigation vector will be obtained. Optionally, return to block 404 and continue the process. When the Bayesian estimator is an RBPMF, the predicted inertial navigation error information (including corresponding statistical information) can be determined as follows. First construct a grid by determining grid of points for time instant, k+1, i.e., $\{\xi_{k+1}^{(i)}\}_{i=1}^{N}$, to sufficiently cover the anticipated support, or region, of predictive PDF $p(x_{k+1}|z^k)$. Then, based on the state equation, determine, using the RBPMF, the point mass PDF of the predicted navigation error vector, $\hat{p}(x_{k+1}|z^k; \xi_{k+1})$, for time instant k+1:

$$\hat{p}(x_{k+1}|z^k; \xi_{k+1}) = \Sigma_{i=1}^{N} P_{k|k}(\xi_{k+1}^{(i)}) S\{x_{k+1}^n; \xi_{k+1}^{(i)}, \Delta_{k+1}\} N\{x_{k+1}^I; \hat{x}_{k+1|k}^{I(i)}, P_{k+1|k}^{(i)}\}. \quad \text{(Equation 9)}$$

EXEMPLARY EMBODIMENTS

Example 1 includes a method for more accurately determining at least position of a moveable object on a terrestrial surface of a celestial body with geo-mapping data and only at least one inertial sensor, comprising: initializing a Bayesian estimator with an a priori estimate of statistical information of an initial current uncorrected inertial navigation vector; receiving, for a current time instance, uncorrected inertial navigation vector for the moveable object on the terrestrial surface of the celestial body; for the current time instance, estimate inertial navigation error information, including corresponding statistical information, using the Bayesian estimator with at least one element of an uncorrected inertial navigation vector and the geo-mapping data; for a current time instance, estimating inertial navigation error information using the Bayesian estimator; error correcting the uncorrected inertial navigation vector, with the estimated inertial navigation error information, for the current time instance; and predicting, using the Bayesian estimator, inertial navigation error information, including corresponding statistical information, for a future time instance when a next uncorrected inertial navigation vector will be obtained.

Example 2 includes the method of Example 1, further comprising: receiving, at the current time instance, inertial data; determining the uncorrected inertial navigation vector with the received inertial data; and wherein estimating the inertial navigation error information comprises estimating the inertial navigation error information with the inertial data.

Example 3 includes the method of any of Examples 1-2, wherein the inertial data comprises proper accelerations in and angular rotation rates about each of three orthogonal axes of the moveable object.

Example 4 includes the method of any of Examples 1-3, wherein estimating the inertial navigation error information comprises estimating the inertial navigation error information with predicted inertial navigation error information including corresponding statistical information.

Example 5 includes the method of any of Examples 1-4, wherein estimating a navigation error vector comprises estimating a navigation error vector consisting of only one of: (a) a position vector element, (b) a position vector element and the velocity vector element, and (c) the position vector element, the velocity vector element, and an attitude and heading vector element.

Example 6 includes the method of any of Examples 1-5, wherein error correcting comprises at least one of: adding or subtracting the inertial navigation error information to an uncorrected inertial navigation vector in Cartesian coordinates, and multiplying or dividing the inertial navigation error information respectively by or into the uncorrected navigation vector in polar coordinates.

Example 7 includes a system for accurately determining at least position of a moveable object with geo-mapping data and only at least one inertial sensor, comprising: processing circuitry configured to: initialize a Bayesian estimator with an a priori estimate of statistical information of an initial current uncorrected inertial navigation vector; receive, for a current time instance, uncorrected inertial navigation vector of the moveable object on the terrestrial surface of the celestial body; for the current time instance, estimate inertial navigation error information, including corresponding statistical information, using the Bayesian estimator with at least one element of an uncorrected inertial navigation vector and the geo-mapping data; for a current time instance, estimate inertial navigation error information using the Bayesian estimator; error correct the uncorrected inertial navigation vector, with the estimated inertial navigation error information, for a current time instance; and predict, using the Bayesian estimator, inertial navigation error information, including corresponding statistical information, for a future time instance when a next uncorrected inertial navigation vector will be obtained.

Example 8 includes the system of Example 7, wherein processing circuitry is further configured to: receive, at the current time instance, inertial data; determine the uncorrected inertial navigation vector with the received inertial data; and wherein estimate the inertial navigation error information comprises estimate the inertial navigation error information with the inertial data.

Example 9 includes the system of any of Examples 7-8, wherein the inertial data comprises proper accelerations in and angular rotation rates about each of three orthogonal axes of the moveable object.

Example 10 includes the system of any of Examples 7-9, wherein estimate the inertial navigation error information comprises estimate the inertial navigation error information with predicted inertial navigation error information including corresponding statistical information.

Example 11 includes the system of any of Examples 7-10, wherein estimate a navigation error vector comprises estimate a navigation error vector consisting of only one of: (a) a position vector element, (b) a position vector element and the velocity vector element, and (c) the position vector element, the velocity vector element, and an attitude and heading vector element.

Example 12 includes the system of any of Examples 7-11, wherein error correct comprises at least one of: add or subtract the inertial navigation error information to an uncorrected inertial navigation vector in Cartesian coordinates, and multiply or divide the inertial navigation error information respectively by or into the uncorrected inertial navigation vector in polar coordinates.

Example 13 includes the system of any of Examples 7-12, further comprising at least one of: at least one inertial sensor coupled to the processing circuitry and configured to provide inertial data to the processing circuitry, and an inertial navigation system coupled to the processing circuitry and configured to provide the uncorrected inertial navigation vector to the processing circuitry.

Example 14 includes the system of any of Examples 7-13, wherein the processing circuitry comprises at least one of: at least one model of an inertial sensor; an error correction unit; geo-mapping data; inertial navigation equations; and a Bayesian estimator.

Example 15 includes the system any of Examples 7-14, wherein the Bayesian estimator is a Rao-Blackwellized point mass filter.

Example 16 includes a program product comprising a non-transitory processor-readable medium on which program instructions, configured to be executed by a programmable processor and for more accurately determining at least position of a moveable object with geo-mapping data and only at least one inertial sensor, are embodied, wherein the program instructions are operable to: initialize a Bayesian estimator with an a priori estimate of statistical information of an initial current uncorrected inertial navigation vector; receive, for a current time instance, uncorrected inertial navigation vector for the moveable object on the terrestrial surface of the celestial body; for the current time instance, estimate inertial navigation error information, including corresponding statistical information, using the Bayesian estimator with at least one element of an uncorrected inertial navigation vector and the geo-mapping data; for a current time instance, estimate inertial navigation error information using the Bayesian estimator; error correct the uncorrected inertial navigation vector, with the estimated inertial navigation error information, for the current time instance; and predict, using the Bayesian estimator, inertial navigation error information, including corresponding statistical information, for a future time instance when a next uncorrected inertial navigation vector will be obtained.

Example 17 includes the program product of Example 16, further comprising: receive, at the current time instance, inertial data; determine the uncorrected inertial navigation vector with the received inertial data; and wherein estimate the inertial navigation error information comprises estimate the inertial navigation error information with the inertial data.

Example 18 includes the program product of any of Examples 16-17, wherein the inertial data comprises proper accelerations in and angular rotation rates about each of three orthogonal axes of the moveable object.

Example 19 includes the program product of any of Examples 16-18, wherein estimate the inertial navigation error information comprises estimate the inertial navigation error information with predicted inertial navigation error information including corresponding statistical information.

Example 20 includes the program product of any of Examples 16-19, wherein error correct comprises at least one of: add or subtract the inertial navigation error information to an uncorrected inertial navigation vector in Cartesian coordinates, and multiply or divide the inertial navigation error information respectively by or into the uncorrected inertial navigation vector in polar coordinates.

A processing system used in the present system and method can be implemented using software, firmware, hardware, or any appropriate combination thereof, as known to one of skill in the art. By way of example and not limitation, the processor circuitry 112 can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by processor circuitry 112. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 110 illustrated herein. For example, the memory circuitry 110 may include magnetic media (such as conventional hard disks), optical media (such as CDs, DVDs, and Blu-ray discs), and semiconductor memory (such as Random Access Memory (RAM) (including, but not limited to, Dynamic Random Access Memory (DRAM), (e.g. Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for more accurately determining at least position of a moveable object on a terrestrial surface of a celestial body with geo-mapping data and only at least one inertial sensor, the method comprising:
   initializing a Bayesian estimator with an a priori estimate of statistical information of an initial current uncorrected inertial navigation vector;
   receiving, for a current time instance, an uncorrected inertial navigation vector for the moveable object on the terrestrial surface of the celestial body;
   for the current time instance, estimate inertial navigation error information, including corresponding statistical information, using the Bayesian estimator with at least one element of the uncorrected inertial navigation vector and the geo-mapping data, wherein the geo-mapping data comprises a representation of terrain elevation or gravity fields with terrain elevation and gravity field strength mapped as a function of terrain surface horizontal position;
   error correcting the uncorrected inertial navigation vector, with the estimated inertial navigation error information and based on the geo-mapping data, for the current time instance; and
   predicting, using the Bayesian estimator, inertial navigation error information, including corresponding statistical information, for a future time instance when a next uncorrected inertial navigation vector will be obtained.

2. The method of claim 1, further comprising:
   receiving, at the current time instance, inertial data;
   determining the uncorrected inertial navigation vector with the received inertial data; and
   wherein estimating the inertial navigation error information comprises estimating the inertial navigation error information with the inertial data.

3. The method of claim 2, wherein the inertial data comprises proper accelerations in and angular rotation rates about each of three orthogonal axes of the moveable object.

4. The method of claim 1, wherein estimating the inertial navigation error information comprises estimating the inertial navigation error information with predicted inertial navigation error information including corresponding statistical information.

5. The method of claim 1, wherein estimating a navigation error vector comprises estimating a navigation error vector consisting of only one of: (a) a position vector element, (b) the position vector element and a velocity vector element, and (c) the position vector element, the velocity vector element, and an attitude and heading vector element.

6. The method of claim 1, wherein error correcting comprises at adding or subtracting the inertial navigation error information to the uncorrected inertial navigation vector in Cartesian coordinates, or multiplying or dividing the inertial navigation error information respectively by or into the uncorrected inertial navigation vector in polar coordinates.

7. A system for accurately determining at least position of a moveable object on a terrestrial surface of a celestial body with geo-mapping data and only at least one inertial sensor, the system comprising:

processing circuitry configured to:
initialize a Bayesian estimator with an a priori estimate of statistical information of an initial current uncorrected inertial navigation vector;
receive, for a current time instance, an uncorrected inertial navigation vector of the moveable object on the terrestrial surface of the celestial body;
for the current time instance, estimate inertial navigation error information, including corresponding statistical information, using the Bayesian estimator with at least one element of the uncorrected inertial navigation vector and the geo-mapping data, wherein the geo-mapping data comprises a representation of terrain elevation or gravity fields with terrain elevation and gravity field strength mapped as a function of terrain surface horizontal position;
error correct the uncorrected inertial navigation vector, with the estimated inertial navigation error information and based on the geo-mapping data, for the current time instance; and
predict, using the Bayesian estimator, inertial navigation error information, including corresponding statistical information, for a future time instance when a next uncorrected inertial navigation vector will be obtained.

8. The system of claim 7, wherein processing circuitry is further configured to:
receive, at the current time instance, inertial data;
determine the uncorrected inertial navigation vector with the received inertial data; and
wherein estimate the inertial navigation error information comprises estimate the inertial navigation error information with the inertial data.

9. The system of claim 8, wherein the inertial data comprises proper accelerations in and angular rotation rates about each of three orthogonal axes of the moveable object.

10. The system of claim 7, wherein estimate the inertial navigation error information comprises estimate the inertial navigation error information with predicted inertial navigation error information including corresponding statistical information.

11. The system of claim 7, wherein estimate a navigation error vector comprises estimate a navigation error vector consisting of only one of: (a) a position vector element, (b) the position vector element and a velocity vector element, and (c) the position vector element, the velocity vector element, and an attitude and heading vector element.

12. The system of claim 7, wherein error correct comprises add or subtract the inertial navigation error information to the uncorrected inertial navigation vector in Cartesian coordinates, or multiply or divide the inertial navigation error information respectively by or into the uncorrected inertial navigation vector in polar coordinates.

13. The system of claim 7, further comprising at least one of: the at least one inertial sensor coupled to the processing circuitry and configured to provide inertial data to the processing circuitry, and an inertial navigation system coupled to the processing circuitry and configured to provide the uncorrected inertial navigation vector to the processing circuitry.

14. The system of claim 7, wherein the processing circuitry comprises at least one of:
(a) at least one model of an inertial sensor;
(b) an error correction unit;
(c) the geo-mapping data;
(d) inertial navigation equations; and
(e) the Bayesian estimator.

15. The system of claim 14, wherein the Bayesian estimator is a Rao-Blackwellized point mass filter.

16. A program product comprising a non-transitory processor-readable medium on which program instructions, configured to be executed by a programmable processor and for more accurately determining at least position of a moveable object on a terrestrial surface of a celestial body with geo-mapping data and only at least one inertial sensor, are embodied, and wherein the program instructions are operable to:
initialize a Bayesian estimator with an a priori estimate of statistical information of an initial current uncorrected inertial navigation vector;
receive, for a current time instance, uncorrected inertial navigation vector for the moveable object on the terrestrial surface of the celestial body;
for the current time instance, estimate inertial navigation error information, including corresponding statistical information, using the Bayesian estimator with at least one element of an uncorrected inertial navigation vector and the geo-mapping data, wherein the geo-mapping data comprises a representation of terrain elevation or gravity fields with terrain elevation and gravity field strength mapped as a function of terrain surface horizontal position;
error correct the uncorrected inertial navigation vector, with the estimated inertial navigation error information and based on the geo-mapping data, for the current time instance; and
predict, using the Bayesian estimator, inertial navigation error information, including corresponding statistical information, for a future time instance when a next uncorrected inertial navigation vector will be obtained.

17. The program product of claim 16, further comprising:
receive, at the current time instance, inertial data;
determine the uncorrected inertial navigation vector with the received inertial data; and
wherein estimate the inertial navigation error information comprises estimate the inertial navigation error information with the inertial data.

18. The program product of claim 17, wherein the inertial data comprises proper accelerations in and angular rotation rates about each of three orthogonal axes of the moveable object.

19. The program product of claim 16, wherein estimate the inertial navigation error information comprises estimate the inertial navigation error information with predicted inertial navigation error information including corresponding statistical information.

20. The program product of claim 16, wherein error correct comprises add or subtract the inertial navigation error information to the uncorrected inertial navigation vector in Cartesian coordinates, or multiply or divide the inertial navigation error information respectively by or into the uncorrected inertial navigation vector in polar coordinates.

* * * * *